United States Patent [19]

Fenwick

[11] Patent Number: 5,161,245
[45] Date of Patent: Nov. 3, 1992

[54] PATTERN RECOGNITION SYSTEM HAVING INTER-PATTERN SPACING CORRECTION

[75] Inventor: David Fenwick, Santa Cruz, Calif.

[73] Assignee: Apple Computer, Inc., Cupertino, Calif.

[21] Appl. No.: 694,527

[22] Filed: May 1, 1991

[51] Int. Cl.$^5$ ............................................. G06K 9/62
[52] U.S. Cl. ................................... 382/40; 382/9; 364/419; 395/63
[58] Field of Search ................. 382/9, 40, 36, 14, 15; 364/900, 419; 395/63

[56] References Cited

U.S. PATENT DOCUMENTS

| | | | |
|---|---|---|---|
| 3,925,761 | 12/1975 | Chaires et al. | 340/146.3 WD |
| 4,010,445 | 3/1977 | Hoshino | 340/146.3 WD |
| 4,580,241 | 4/1986 | Kucera | 364/900 |
| 4,701,851 | 10/1987 | Bass et al. | 364/419 |
| 4,704,703 | 11/1987 | Fenwick | 364/900 |
| 4,731,857 | 3/1988 | Tappert | 382/9 |
| 5,050,218 | 9/1991 | Ikeda et al. | 382/9 |

FOREIGN PATENT DOCUMENTS

| | | | |
|---|---|---|---|
| 61-194584 | 8/1986 | Japan . | |
| 63-136291 | 6/1988 | Japan . | |
| 2166588 | 6/1990 | Japan | 382/9 |

Primary Examiner—David K. Moore
Assistant Examiner—Yon Jung
Attorney, Agent, or Firm—Timothy D. Casey

[57] ABSTRACT

A pattern recognition system having inter-pattern spacing correction is disclosed which recognizes words and determines where to place spaces between those words by (a) storing each input character in one or more buffers in memory, (b) comparing the last entry of each buffer against a dictionary of known words, (c) copying last entries which match words to new buffers and placing a space after the last entry in the old buffer, (d) deleting a buffer when a last entry from that buffer does not at least match the beginning of a known word in the dictionary, (e) repeating steps (a) through (d) until all the buffers have been deleted or until an end character, such as a carriage return or period has been stored in each buffer, (f) again comparing the last entries from each buffer to the dictionary and deleting any buffer having a last entry which is not a known word in the dictionary or which does not end with a space followed by an end character, and (g) saving and/or outputting the remaining words. Common words which appear in each buffer, and have therefore been positively identified, can be saved or output to reduce the size of each buffer at any point in the process. Words can either be output in the longest possible combined form or in shorter segmented forms as desired by a user.

17 Claims, 6 Drawing Sheets

| PASS | BUFFER 1 | BUFFER 2 | BUFFER 3 | BUFFER 4 |
|---|---|---|---|---|
| 1 | t | | | |
| 2 | th | | | |
| 3 | the_ | the | | |
| 4 | the_n | then_ | then | |
| 5 | the_ne | then_e | the_ne | |
| 6 | the_new_ | then_ew | the_new | |
| 7 | new_t | newt | newt_ | |
| 8 | new_to_ | newto | newt_o | new_to |

| PASS | BUFFER 1 | BUFFER 2 | BUFFER 3 | BUFFER 4 |
|---|---|---|---|---|
| 1 | t | | | |
| 2 | th | | | |
| 3 | the_ | the | | |
| 4 | the_n | then_ | then | |
| 5 | the_ne | then_e | ~~then_e~~ | |
| 6 | the_new_ | ~~then_ew~~ | the_new | |
| 7 | new_t | newt | newt_ | |
| 8 | new_to_ | newto | newt_o | new_to |

FIG. 5a

PATTERN RECOGNITION SYSTEM HAVING INTER-PATTERN SPACING CORRECTION

FIELD OF THE INVENTION

The present invention relates generally to pattern recognizers, and more particularly, to a pattern recognition system for recognizing known patterns or groups of pattern and, in the process, correcting spacing errors between those patterns and groups of patterns.

BRIEF DESCRIPTION OF PRIOR ART

Writing tablets and optical character readers typically digitize input data, such as alphanumeric character strings, and output pattern data to a computer system for further analysis. A number of recognition processes are then carried out on the pattern data within the computer system to recognize particular individual patterns (typically characters) as well as various groups of patterns (typically words). The process of recognizing characters is quite distinct from the process of recognizing words.

In a typical pattern recognition system, various pattern groups (which may be as small as a single individual pattern) are formed from the pattern data by measuring the inter-pattern spacing distance between adjacent individual patterns. Adjacent patterns which are spaced apart from each other by less than a threshold inter-pattern distance are typically combined together to form one pattern group. Adjacent patterns spaced apart by more than the threshold amount are assumed to correspond to next adjacent pattern groups.

A significant problem with this prior technique is that a relatively large inter-pattern distance between adjacent patterns can sometimes be mistakenly identified as a space between pattern groups, resulting in a single pattern group being split into separate, and generally incomprehensible, parts. For example, in a word recognition system where certain combinations of characters or the manner in which those characters are input (i.e., nonuniform or sloppy handwriting may result in all kinds of recognition problems) can create irregular inter-character spacing, this technique may result in the letters within a word being incorrectly recognized as belonging to separate words. Inter-character spacing problems are of particular significance in handwriting recognition systems where writing styles and writing clarity can vary substantially.

A word recognition system that purportedly corrects mistakes in the segmentation of a character by either dividing or aggregating an erroneous character is described in Japanese Patent Publication No. 63-136291, by Nakabayashi. However, the system of the Nakabayashi publication is directed to spacing errors between the pixels of individual characters rather than spacing errors between the characters of a character string and would not be suited for word recognition and segmentation.

Japanese Patent Publication No. 61-194584, by Kurosawa, describes a word recognition system in which words that are not registered in a partial word dictionary can nevertheless be recognized using the dictionary for output by the system. The system described by Kurosawa initially assumes that a column of input characters forms a single word, regardless of whether that word is in the partial word dictionary. To validate this assumption, however, the column is "cut off" (separated) into candidate words, which are each collated against the partial word dictionary. The degree of resemblance between the candidate words and the words in the dictionary is calculated by a "calculator" to determine if the combination of candidate words forms a "synthesized word" (a combination of words), which itself is not registered in the dictionary. Since the Kurosawa system only segments character strings for the purpose of attempting to operate a word recognition system through use of a partial word dictionary, and is not concerned with attempting to segment improperly combined words caused by inter-character spacing errors, it achieves a result which is exactly opposite of that required to resolve the spacing error problems discussed above. For example, if the word "newton" did not appear in the partial word dictionary, but the words "new" and "ton" were in the dictionary, the Kurosawa system would split the word "newton" into the candidate words "new" and "ton", match those candidate words in the partial word dictionary, and output "newton" as a synthesized word, regardless of whether a spacing error between the "w" and "t" caused the individual words "new" and "ton" to be incorrectly combined as "newton".

A compound word spelling verification system that parses a compound word into its constituent word fragments is also described in U.S. Pat. No. 4,701,851, issued to Bass et al. The Bass system, however, like the Kurosawa system, is directed to the analysis of languages, such as German, in which the common use of compound words typically requires extremely large dictionaries to be used for spelling verification. The Bass system is therefore not concerned with nor directed to the correction of inter-character spacing errors. Another spelling related reference having little bearing on the resolution of inter-character spacing errors in U.S. Pat. No. 4,580,241, issued to Kucera, which describes a spelling correction system that deletes those letters of a word which form a phonetic portion having an ambiguous spelling so as to form a skeletal version of the word for comparison with a dictionary of skeletonized words.

SUMMARY OF THE INVENTION

The pattern recognition system of the preferred embodiment of the present invention recognizes words and determines where to place spaces between those words by (a) storing each input character in one or more buffers in memory, (b) comparing the last entry of each buffer against a dictionary of known words, (c) copying last entries which match words to new buffers and placing a space after the last entry in the old buffer, (d) deleting a buffer when a last entry from that buffer does not at least match the beginning of a known word in the dictionary, (e) repeating steps (a) through (d) until all of the buffers have been deleted or until an end character, such as a carriage return or period has been stored in each buffer, (f) again comparing the last entries from each buffer to the dictionary and deleting any buffer having a last entry which is not a known word in the dictionary or which does not end with a space followed by an end character, and (g) saving and/or outputting the remaining words. Common words which appear in each buffer, and have therefore been positively identified, can be saved or output to reduce the size of each buffer at any point in the process. Words can either be output in the longest possible combined form or in shorter segmented forms as desired by a user.

BRIEF DESCRIPTION OF THE DRAWING

FIGS. 5a and 5b illustrate the manner in which characters and spaces are appended in buffer memory in accordance with the method of FIGS. 2, 3 and 4.

DETAILED DESCRIPTION OF PREFERRED EMBODIMENT

Figure 1:
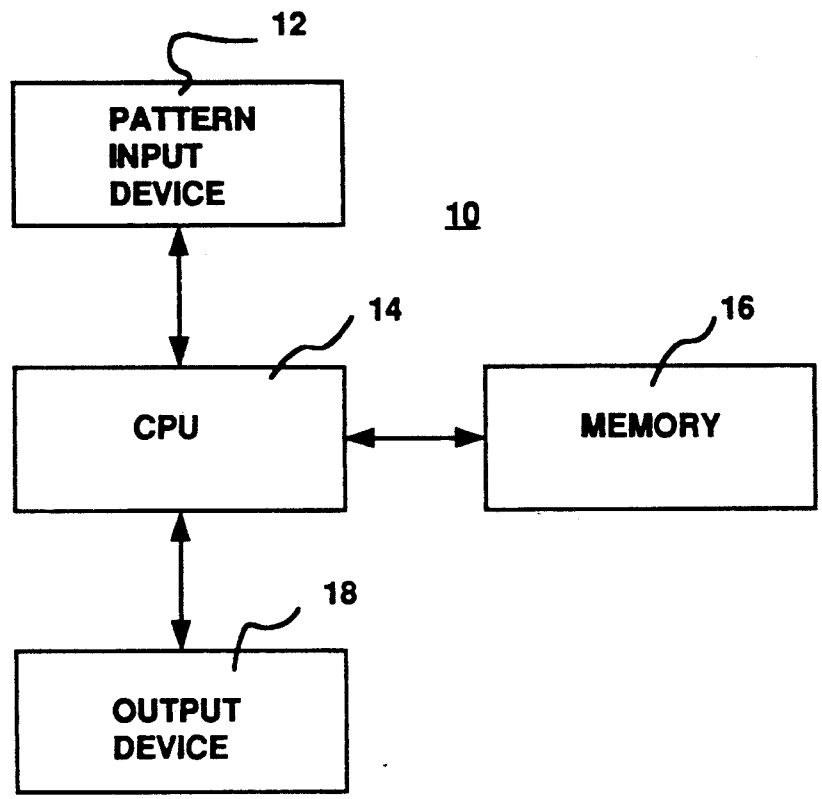
FIG. 1 is a block diagram of a computer system for implementing the pattern recognition system of the preferred embodiment of the present invention.

FIG. 1 illustrates a simplified block diagram of a computer system 10 for implementing the pattern recognition system of the present invention. Patterns or characters are entered into the system by pattern input device 12, which could be any of a number of different types of devices, such as an electronic writing tablet or an optical scanner. Electronic signals corresponding to the input patterns are then input to the processor, central processing unit (CPU) 14, which, together with memory 16, identifies patterns or groups of patterns from the input data and properly combines those patterns and spaces to form proper groups or combinations of patterns or words. Properly identified groups of patterns or words are then output to an output device 18, such as a display screen or some other type of peripheral device and/or storage.

CPU 14 could be a specially designed processor, such as an ASIC, which would perform the detection and spacing correction methods of the present invention in hardware, or hardware combined with software, or it could be a standard commercially available microprocessor, such as Motorola's 68040 microprocessor, that had been programmed with software to perform the pattern detection and inter-pattern spacing correction methods of the present invention. For that matter, system 10 could be a commercially available computer system, such as any one of the Macintosh computers manufactured by Apple Computer, Inc., of Cupertino, Calif., having a scanner or digitizing tablet connected through a peripheral port or ADB (Apple Desktop Bus) port for entering the patterns to be identified.

Figure 2:
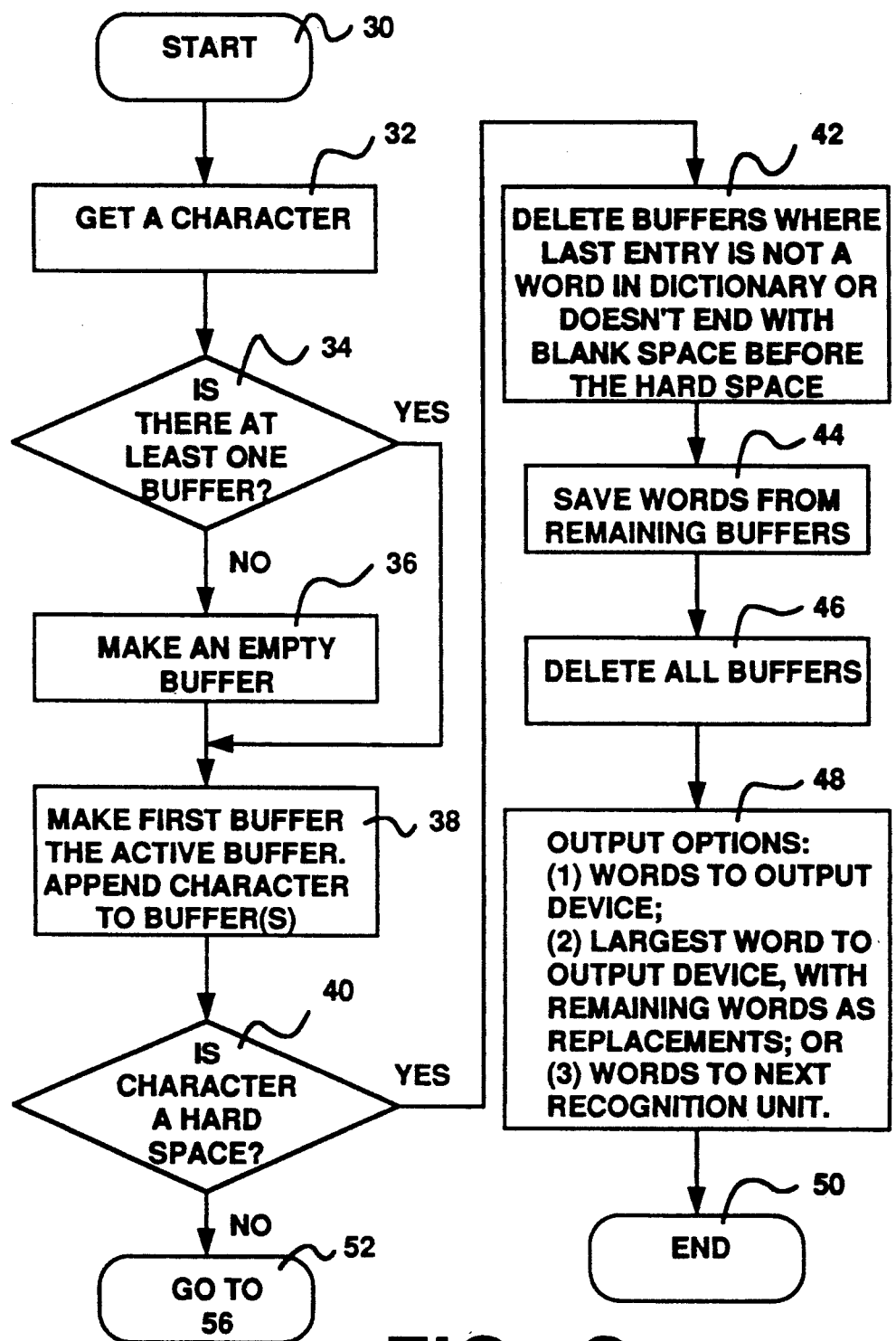
FIGS. 2, 3 and 4 are flow chart diagrams illustrating a method for implementing the pattern recognition system of the preferred embodiment of the present invention.
Figure 3:
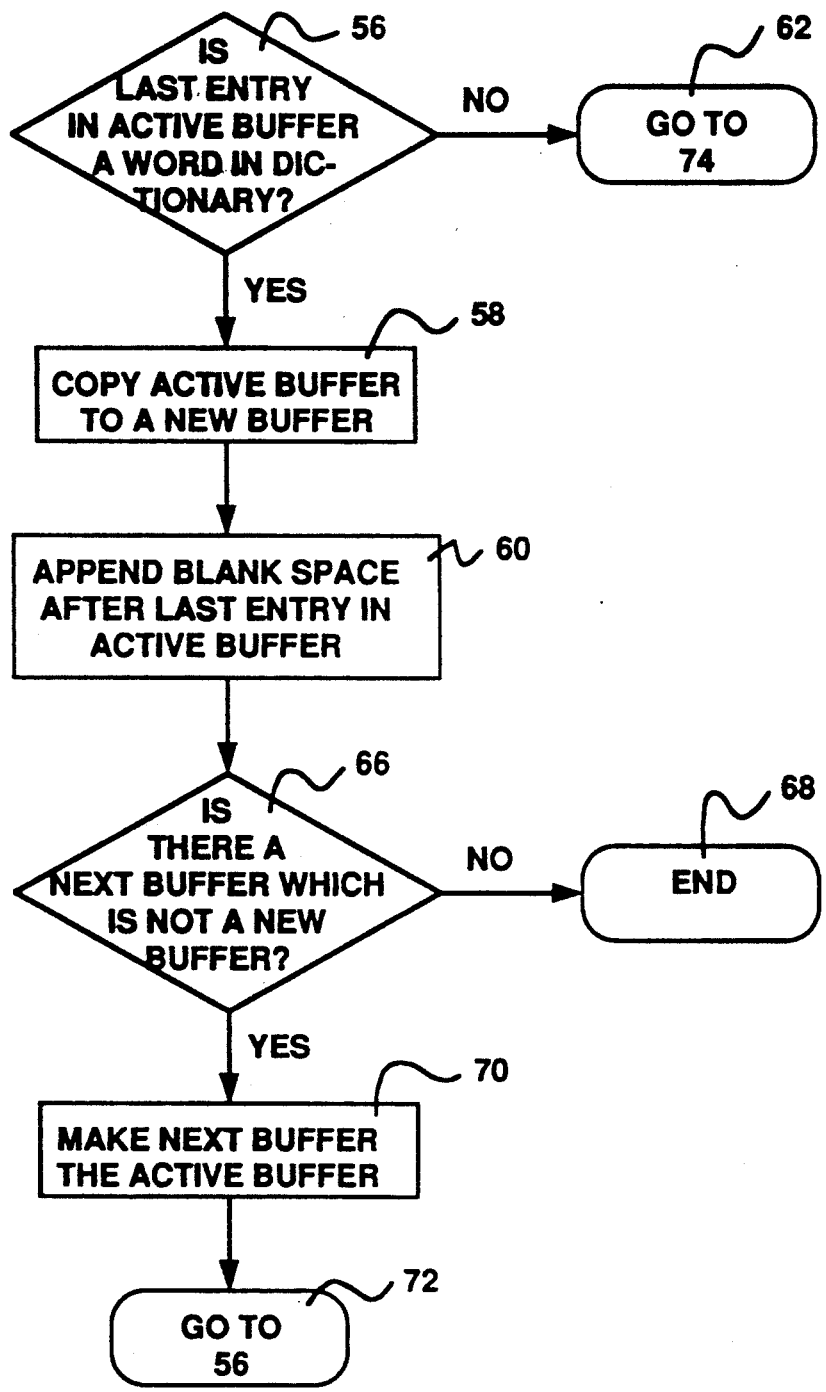

Regardless of the particular physical implementation utilized, the system and associated methods of the preferred embodiment of the present invention follow the same basic process, which can be explained in detail with reference now to FIGS. 2 through 5a and 5b. With reference now to FIG. 2, the detection and correction system begins the process with START block 30 as data enters the system through pattern input device 12. This data can be entered into the system in a great number of different manners according to various pattern recognition processes, which are well known in the art (any one of which could be appropriately combined for use in the context of the present invention). By means of these pattern recognition processes, the individual patterns or characters of the raw input data are detected and input to the present system for further processing.

Although the preferred embodiment of the present invention is described in terms of detecting words and correcting or preventing spacing errors between characters, the input data to be analyzed can also correspond to any type of discernible pattern, such as a musical note, geometric figure, signal waveform, etc., provided that appropriate segmentation rules can be established for separating the input data, and that the know figures are distinct enough to be readily cataloged in a database of known patterns (strings or groups of possible patterns) or figures, such as a dictionary, which can then be stored in memory 16. It should be noted that within the context of the present invention, the word "segmentation" is only used to describe the process of breaking the input data into manageable pieces of input data for subsequent recognition and analysis. Hence, "segmentation" describes the process of breaking continuous data, strokes, or combinations of strokes, into pieces of input data. Since the patterns which can be recognized and segmented in accordance with the present invention vary greatly, it should also be noted that groups of patterns will not always be divided by spaces, as is true with characters and words, and may be divided by some other type of divider indicating segmented patterns.

As previously stated, the rules by which the input data are segmented by the input device for output to the CPU 14 can vary greatly depending on the type of information being input, such as printed letters, cursive letters, musical notes, geometric figures, etc. In the context of the present invention, however, prior to application of the detection and correction system described herein, it makes little difference whether the input data is comprised of recognized patterns (positively identified, specific individual patterns) or unrecognized patterns, provided that those unrecognized patterns derived from the input data and accurately compared with known or defined patterns stored in the database. Nonetheless, in order to simplify the description of the preferred embodiment of the present invention, which is directed to use with a character recognition system, the input patterns are referred to as "characters" which have already been recognized, and the groups of patterns are referred to as words, regardless of the number of characters comprising each word.

Once initiated, the system of the present invention begins by getting or retrieving a character, block 32, from a string of characters input to the CPU 14 from storage within the CPU 14 or memory 16. The system then checks to see if at least one position in memory, such as a memory buffer, is available, block 34. This memory is typically either a virtual memory or a hardware-based memory within which a character can be stored. If no buffer is available, an empty buffer is created, block 36. This first buffer, or otherwise the oldest buffer, is then made the active buffer so that the system always starts from a consistent memory location. Once the active buffer is designated, the character retrieved above is appended to the content of all of the available buffers, block 38. If the character is stored in an empty buffer, this character would form the first character of a series of characters to be stored in the buffer. If the character is stored in a buffer containing other characters, this character is added to the preexisting series of characters in that buffer, thereby continuing formation of the series in that buffer.

After the character has been appended to the available buffers, the character is then analyzed to determine if it corresponds to a "hard space", block 40, indicating the end of the string of characters being input to the CPU 14 during this round of processing. A "hard space" or "end character" is any character, symbol, pattern, or large blank space which indicates that an end of a sentence or line of characters has been reached. For instance, the end of a line of characters is typically indicated by a carriage return ("<cr>"), while the end of a sentence is typically indicated by a period ("<.>"), question mark ("?"), etc. For purposes of the present invention, a carriage return is defined as the end of a line of characters, regardless of whether it is actually caused by a carriage return command or the wrapping around of text due to margin constraints.

If the character is a "hard space" the system proceeds to delete the content of all of the buffers where the last entry in the buffer is not in the dictionary or database, or where the last entry doesn't end with a blank space before the hard space, block 42. The last entry in the buffer is defined as all of the characters in the buffer if the buffer contains no spaces or the last collection of characters stored in the buffer after one space and before the final space and hard space. As will be further explained below, this step cleans out the buffers whose pattern group content did not completely match words stored in the dictionary or who had a more preferable counterpart already stored in another buffer. The remaining buffers contain the final matched series of characters left from the recognition process, meaning each buffer only contains one or more known words.

The known words contained within the remaining buffers are then saved in memory 16, or within memory of the CPU 14, block 44. The content of all of the buffers is then deleted to prepare the system to process the next character string, block 46. At this point, the user of the system has a number of predetermined options which are typically preselected by the user. In option (1) of block 48, the saved words are simply output from memory to the output device 18 and the process is terminated, block 50. Alternatively, where a number of different words have been formed from the same character string, options (2) and (3) of block 48 may be more desirable. In option (2) of block 48, only the largest saved word is output to the output device with the remaining words saved as replacement words so the user can make a choice as to which word or combination of words is most desirable. Option (2) of block 48 will be explained in greater detail with reference to FIG. 5 below. In option (3) of block 48, all of the saved words are output to another recognition unit, which then decides which word or combination of words is best to use in the context of the most recent previously recognized words.

Figure 4:
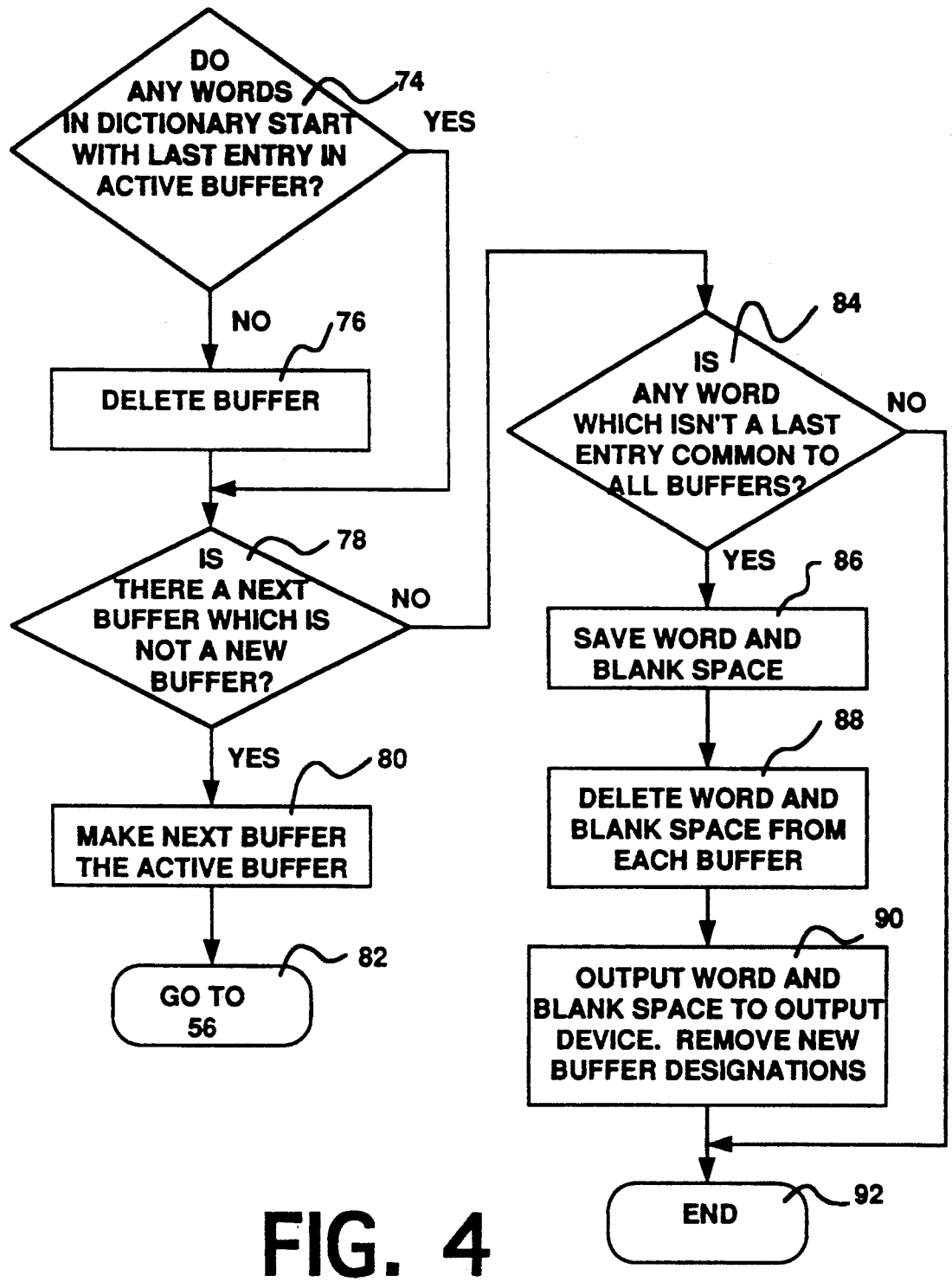

With reference now to FIG. 4, if at block 40, the character was found not to be a "hard space", the system would proceed, block 52, to analyze at least a portion of the content of the active buffer, block 56, such as the last entry in the buffer. If the last entry in the active buffer is determined to match a word in the dictionary, block 56, the content of the active buffer is duplicated to a new buffer, block 58. A "blank space" is then appended after this matched last entry in the active buffer, block 60, to indicate that a word has been formed. If the last entry in the active buffer does not match a word in the dictionary, block 56, the system proceeds to block 74, block 62, which will be further explained below with reference to FIG. 4.

After appending a blank space after the matched last entry in the active buffer, block 60, the system looks to see if there is a next buffer which is not a new buffer, block 66. If the only buffers left, which have not been checked during the present pass through the system, are new buffers, the process is ended, block 68. But if there is a next buffer which is not a new buffer, the next buffer is made into the active buffer, block 70, and the system proceeds, block 72, to block 56 to check the last entry of this buffer against the dictionary.

Figure 5B:
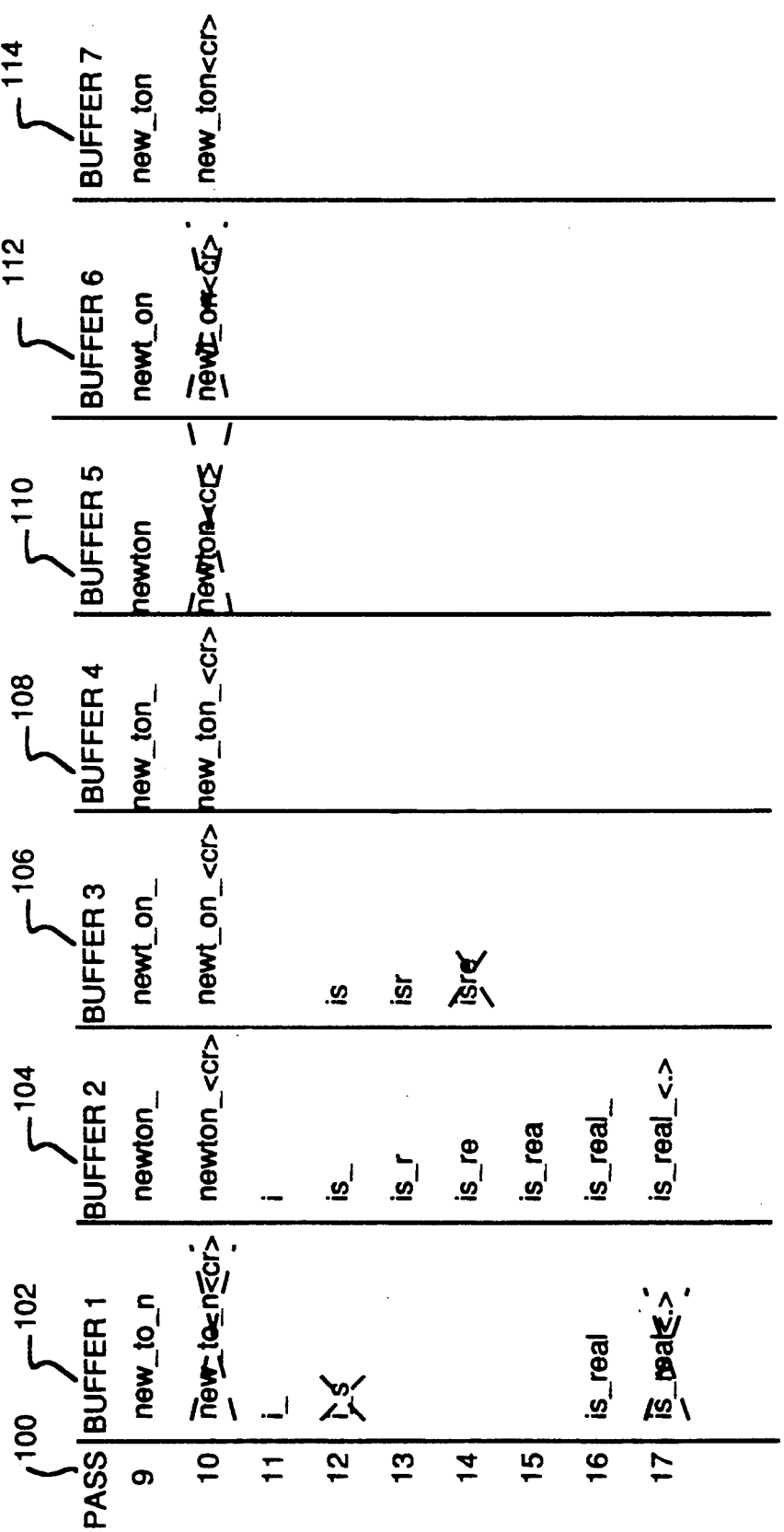

With reference now to FIGS. 5a and 5b, if the last entry in the active buffer did not match a word in the dictionary, block 56, the system checks the dictionary to see of any of the words in the dictionary start with the characters of the last entry in the active buffer, block 74. If the character or characters of the last entry of the active buffer do not form the beginning of any word in the dictionary, the buffer is deleted, block 76, since no word in the dictionary could ever possibly be formed from this unmatchable last entry. If at least one word in the dictionary begins with the last entry of the active buffer, or if the buffer is deleted, the system again looks to see if there is a next buffer which is not a new buffer, block 78. If there is another buffer, which is not a new buffer, the next buffer is made to be the active buffer, block 80, and the system loops back, block 82, to repeat the process starting at block 56.

If there are no more old buffers to check, block 78, the system looks to see if there is any word, which is not a last entry, which is common to all of the remaining buffers, block 84. If there is such a word, then that word has been properly identified and can be saved with its appended blank space in memory, block 86. After saving the word and blank space, both are deleted from each of the buffers, block 88. The word and blank space are then output to the output device, block 90, and the new buffer designations are removed so that these buffers can be checked by the system during its next pass. At this point, or if there was no word common to all of the buffers from block 84, the process is ended, block 92, until the next character is selected from memory.

Looking now to FIGS. 5a and 5b, the above process will be further illustrated with reference to a particular sentence entered into the system 10 through pattern input device 12. The sentence is: "the newton<cr> is real<.>"; where "<cr>" is a carriage return, and "<.>" is a period. The dictionary stored in memory 16 is comprised of the following words: "the", "then", "new", "newt", "newton", "to", "ton", "on", "I", "is", "Israel" and "real", where capital letters are considered to be the same as small case letters. Column 100 of FIG. 5 represents the seventeen different passes through the process described above which occur as this sentence is analyzed, and columns 102 through 114 represent the content of the Buffers 1 through 7 during the various passes of the process. When the sample sentence was processed in accordance with the methods of the present invention, the first letter retrieved in block 32 was the letter "t". Since there were no buffers available at that point, Buffer 1 was made, as a result of block 36, and designated as the active buffer, as a result of block 38. The letter "t" was then appended to Buffer 1, column 102. Since "t" was not a hard space, the system tested the last entry in the active buffer, "t", to see whether it formed a word, block 56. Although "t" was not a word, it was determined that there were words in the dictionary that started with "t", block 74, so Buffer 1 was not deleted in block 76. There was no next buffer, block 78, and no common word in all of the buffers, block 84, so the process was ended for that retrieved character, block 92.

The next retrieved letter "h" followed substantially the same process as "t" and ended up stored in Buffer 1. Since the letter "e", when appended to "th" formed a word, "the", the word was copied from the active buffer, Buffer 1, to a new buffer, Buffer 2, column 104, and a blank space was appended after "e" in Buffer 1. Since there was no next buffer which was not a new buffer, the process ended, block 68. Although retrieval of the letter "n" simply caused the letter "n" to be appended to Buffer 1 when Buffer 1 was the active buffer, it caused a new word to be formed, "then", when buffer 2 was the active buffer. After determining that a new word had been formed, a space was added to Buffer 2, the buffer from which the word came from, and the content of Buffer 2 was copied to the new buffer, Buffer 3, column 106. In Pass 5, Buffers 1 through 3 had the letter "e" appended, but Buffer 3 was deleted (as indicated by the crossing dashed lines), block 76, because the last entry in Buffer 3 neither formed a word in the dictionary, block 56, nor the start of any word in the dictionary, block 74.

In Pass 6, another word was formed in Buffer 1, so its contents were copied to Buffer 3, which was deleted in Pass 5, and a space was appended to the last entry of Buffer 1. Since the last entry in Buffer 2 "ew" did not correspond to the start of any word in the dictionary, Buffer 2 was deleted. In addition, the word "the" was saved from Buffers 1 and 3 and then deleted because "the" was a common word in all of the remaining buffers. In Pass 7, a new word "newt" was formed and copied from Buffer 3 to Buffer 2, which was deleted in Pass 6. After it was determined that the addition of the letter "t" to the word "new—" in Buffer 1 formed the start of a word in the dictionary, block 74, the system asked if there was a next buffer which was not a new buffer. Although Buffer 3 was a new buffer in Pass 6, it lost its new buffer designation at the end of the Pass, block 90. So when the system looked for a next buffer that was not new, it selected Buffer 3 as the active buffer (Buffer 2 would have been empty at the time, having been deleted in Pass 6). Subsequent analysis of the content of Buffer 3 would have revealed that a new word "newt" had been formed, so the content of Buffer 3 would have been copied to a new buffer, which in this case was Buffer 2, since it was the next available empty buffer location. Pass 8 saw the addition of the word "to" and the copying of the content of Buffer 1 to Buffer 4, column 108.

Pass 9, illustrated in FIG. 5b, saw the addition of the words "newton", "on", and "ton", and the copying of the contents of Buffer 2 to Buffer 5, column 110, the contents of Buffer 3 to Buffer 6, column 112, and the contents of Buffer 4 to Buffer 7, column 114. The character retrieved in Pass 10 was the hard space "<cr>", block 40. As a result of block 42, any buffer where the last entry was not a word in the dictionary (Buffer 1) or didn't end with a blank space before the hard space (Buffers 5-7) was deleted. The remaining words, "newton—<cr>", "newt—on—<cr>", and "new—ton—<cr>" were saved with their blank spaces (both between words and at the end of words) and the remaining buffers were all deleted. These words were then output in accordance with block 48.

In Pass 11, the process was restarted on a new string of input characters, starting with the letter "i" being appended to Buffer 1. Since "i" as a letter forms a word, a group of patterns as well, in the dictionary, the content of Buffer 1 was copied to a new buffer, Buffer 2, and a space was added to Buffer 1. After the "s" in Pass 12 was appended to "i", another word was formed, so Buffer 2 was copied over to Buffer 3 and a space was added to the end of the last entry in Buffer 2 to form "is—". Although many words normally start with the letter "s", there are no such words in the dictionary specified above, so the content of Buffer 1, "i—s" was deleted. An "r" was then added to both Buffer 2 and Buffer 3 in Pass 13, and an "e" to both buffers in Pass 14. With the appendance of an "e" to both buffers in Pass 14, however, it is determined that no word in the dictionary starts with "isre", so Buffer 3 is deleted, leaving only Buffer 2. In pass 16, a new word, "real" is created, so the content of buffer 2 is copied to the new buffer, Buffer 1. In Pass 17, Buffer 1 was deleted, however, because the appendance of the hard space "<.>" to each buffer caused the content of that buffer to be recognized as a last entry that didn't have a blank space before the hard space, block 42. Hence, the words "is—real—<.>" was output in accordance with block 48, and the process was ended.

Although the present invention has been described in terms of its application for word recognition and inter-character spacing correction, the principles employed herein can also be implemented concurrently with other types of recognition and processing systems, such as the Dynamic Input Processing System of U.S. Pat. No. 4,704,703, issued to the present inventor and assigned to Apple Computer, Inc. In addition, although the present invention has been described with reference to FIGS. 1-5 and with emphasis on a particular embodiment, it should be understood that the figures are for illustration only and should not be taken as limitations upon the invention. It is contemplated that many changes and modifications may be made by persons of ordinary skill in the art to the elements, process and arrangement of elements or steps of the invention without departing from the spirit and scope of the invention as disclosed above.

I claim:

1. A method for recognizing groups of patterns from a string of patterns derived from data input to a processor and placing dividers between the groups of patterns, comprising the steps of:

(a) storing a pattern from said string of patterns in one or more memory positions of a memory in communication with said processor to start or continue formation of one or more series of patterns;

(b) comparing at least a portion of each of said series with a database of defined groups of patterns to locate any matched entries or any unmatchable entries from each of said series, a matched entry including one or more sequential patterns from one of said series which match one of said defined groups of patterns, an unmatchable entry including one or more sequential patterns from one of said series which do not match at least a beginning of one of said defined groups of patterns;

(c) copying each of said series having one of said matched entries from an old memory position to a new memory position in said memory;

(d) placing a divider after said matched entry as stored in said old memory position;

(e) deleting each of said series having one of said unmatchable entries from said memory;

(f) repeating steps (a) through (e) to continue formation of said series until all of said series have been deleted or until an end pattern indicating the end of said string has been stored in one or more of said memory positions;

(g) comparing a last entry from each of said series with said database to locate any final matched series, a final matched series including one or more sequential patterns from one of said series which match one of said defined groups of patterns and which ends with one of said dividers followed by one of said end patterns;

(h) deleting any of said series which is not one of said final matched series; and (i) saving all of said final matched series in said memory.

2. A method for recognizing groups of patterns, as recited in claim 1, and further comprising the step of (j) outputting predetermined types of said final matched series to an output device for display.

3. A method for recognizing groups of patterns, as recited in claim 2, wherein said predetermined types are large groups of patterns formed from smaller groups of patterns from a single final matched series.

4. A method for recognizing groups of patterns, as recited in claim 3, wherein said large groups are output as preferred groups of patterns and said smaller groups of patterns are output as optional groups of patterns for selection by a user.

5. A method for recognizing groups of patterns, as recited in claim 1, and further comprising, after step (e) and before step (f), the step of (k) saving one of said matched entries as one of said final matched series and deleting each of said matched entries from said old memory positions and said new memory positions if said matched series is common to all of said series and if there are at least two of said series in said memory.

6. A method for recognizing groups of patterns, as recited in claim 1, wherein said patterns are characters and symbols from a written language, wherein said defined groups of patterns form words and meaningful symbols in said written language, and wherein said dividers form spaces between said words and meaningful symbols.

7. A method for recognizing groups of patterns, as recited in claim 6, wherein said end patterns include punctuation marks indicating an end to a sentence in said written language.

8. A method for recognizing words from a string of characters derived from data input to a processor and placing spaces between the words, comprising the steps of:

(a) storing a character from said string of characters in one or more memory positions of a memory in communication with said processor to start or continue formation of one or more series of characters;

(b) comparing at least a portion of each of said series with a database of defined words to locate any matched entries or any unmatchable entries from each of said series, a matched entry including one or more sequential characters from one of said series which match one of said defined words, an unmatchable entry including one or more sequential characters from one of said series which do not match at least a beginning of one of said defined words;

(c) copying each of said series having one of said matched entries from an old memory position to a new memory position in said memory;

(d) placing a space after said matched entry as stored in said old memory position;

(e) deleting each of said series having one said unmatchable entries from said memory;

(f) repeating steps (a) through (e) to continue formation of said series until all of said series have been deleted or until an end character indicating the end of said string has been stored in one or more of said memory positions;

(g) comparing a last entry from each of said series with said database to locate any final matched series, a final matched series including one or more sequential characters from one of said series which match one of said defined words and which ends with one of said spaces followed by one of said end characters;

(h) deleting any of said series which is not one of said final matched series; and (i) saving all of said final matched series in said memory.

9. A method for recognizing words, as recited in claim 8, and further comprising the step of (j) outputting predetermined types of said final matched series to an output device for display.

10. A method for recognizing words, as recited in claim 9, wherein said predetermined types include one or more large words formed from smaller words from a single final matched series.

11. A method for recognizing words, recited in claim 10, wherein said large words are output as preferred words and said smaller words are output as optional words for selection by a user.

12. A method for recognizing words, as recited in claim 8, and further comprising, after step (e) and before step (f), the step of (k) saving one of said matched entries as a final matched series and deleting each of said matched entries from said old memory positions and said new memory positions if said matched series is common to all of said series and if there are at least two of said series in said memory.

13. A method for recognizing words, as recited in claim 8, wherein said end character includes punctuation marks indicating an end of a sentence.

14. A method for recognizing words, as recited in claim 8, wherein said end character includes a carriage return symbol.

15. A word recognition system for recognizing words from a string of characters derived from input data and placing dividers between the words, comprising:

processing means for receiving said input data from an input device, detecting said words, determining whether said words should be combined together to form large words or separated into small words by said dividers, and outputting said large words and said small words in accordance with a user selected predetermined output option; and storage means for communicating with said processing means and storing said characters and said words at one or more memory positions wherein one or more series of said characters and said dividers are formed or appended at a memory position when said storage means stores a character at said memory position, said series including said characters and said dividers forming said words, and wherein said processing means includes:

means for comparing at least a portion of each of said series with a database of defined words to locate any matched entries or any unmatchable entries from each of said series, a matched entry including one or more sequential patterns of said characters from one of said series which match one of said defined words, an unmatchable entry including one or more sequential patterns of said characters from one of said series which do not match at least a beginning of one of said defined words;

means for copying each of said series having one of said matched entries from an old memory position to a new memory position in said storage means;

means for placing a divider after said matched entry as stored in said old memory position;

means for deleting each of said series having one of said unmatchable entries from said storage means;

means for continuing to form said series from said string of characters until all of said series have been deleted or until an end pattern indicating the end of said string of characters has been stored in one or more of said memory positions;

means for comparing a last entry from each of said series with said database to locate any final matched series, a final matched series including one or more sequential patterns from one of said series which match one of said defined words and which ends with one of said dividers followed by one of said end patterns;

means for deleting any of said series which is not one of said final matched series; and means for saving all of said final matched series in said storage means.

16. A word recognition system for recognizing words, as recited in claim 13, and further comprising means for saving one of said matched entries as a final matched series and deleting each of said matched entries from said storage means if said matched series is common to all of said series and if there are at least two of said series in said storage means.

17. A word recognition system for recognizing words, as recited in claim 15, wherein said end patterns include symbols indicating an end of a sentence and a line of said characters in a written language.

* * * * *